May 4, 1965   L. C. H. JUY   3,181,384
CHAIN SHIFT DEVICES FOR BICYCLES AND SIMILAR
CHAIN DRIVEN VEHICLES
Filed March 20, 1963

United States Patent Office 3,181,384
Patented May 4, 1965

3,181,384
CHAIN SHIFT DEVICES FOR BICYCLES AND SIMILAR CHAIN DRIVEN VEHICLES
Lucien Charles Hippolyte Juy, 75 Rue General Fauconnet, Dijon, France
Filed Mar. 20, 1963, Ser. No. 266,727
Claims priority, application France, Apr. 20, 1962, 8,429
10 Claims. (Cl. 74—242)

This invention relates to a chain shift device for bicycles, tandems, motorized bicycles, motor-cycles and like vehicles.

According to the present invention there is provided a chain shift device for a bicycle or like chain driven vehicle, comprising a housing of synthetic plastic material for attachment to a frame member of the vehicle, said housing being formed with a bore in which there is located a metal sleeve, a spring loaded spindle axially slidable in said sleeve and protruding beyond the bore in said housing, chain guide means for displacement of a chain of the vehicle during a gear change operation, said chain guide means being carried by said spindle externally of said housing. The chain shift device further comprises a mechanism having parts disposed in said housing for moving said spring loaded spindle to effect a desired displacement of the chain.

Figure 1:
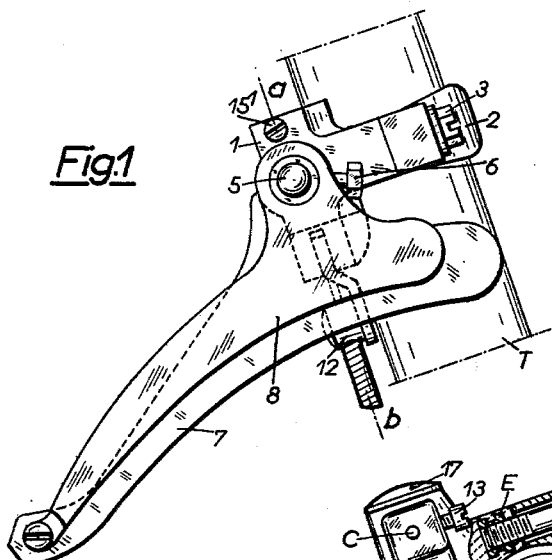
Figure 2:
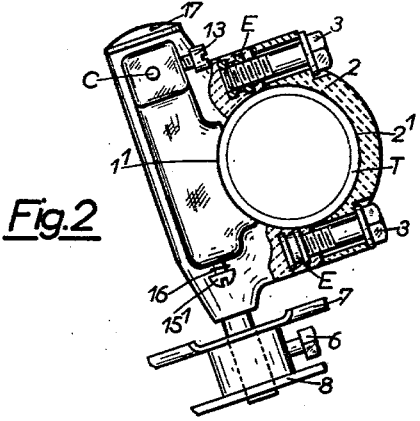
Figure 3:
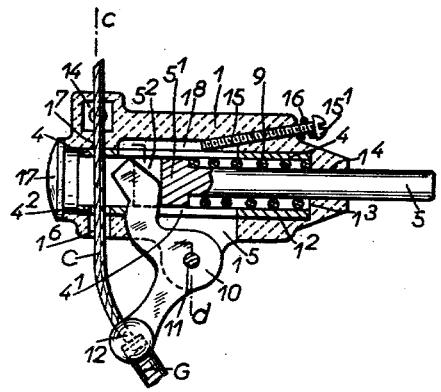
Figure 4:
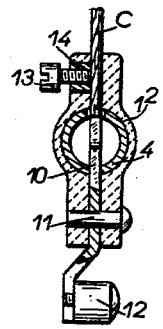

For a better understanding of the invention and to show how the same may be carried into effect reference will now be made, by way of example, to the accompanying drawing, in which:

FIGURE 1 is a side view of a part of a chain shift device in accordance with the invention, FIGURE 2 is a plan view, partially in section, of the chain shift device shown in FIGURE 1, FIGURE 3 is a sectional view taken along the line $a$–$b$ of FIGURE 1, and FIGURE 4 is a cross-sectional view taken along the line $c$–$d$ of FIGURE 3.

Referring to the drawing there is shown a chain shift device including a housing 1 which is releasably mounted on a tubular member T of a vehicle frame. The housing 1 is formed with a concave recess $1^1$ which has substantially the same curvature as the member T. A bracket 2 which is substantially semi-circular in cross-section is formed at each end with an apertured lug, each of which lugs being arranged to receive a screw 3 adapted to engage with a screw-threaded portion E formed in the housing 1 so that when the screws 3 are screwed into the screw-threaded portions E the housing may be rigidly secured to the tubular member T. The screw-threaded portions E may be in the form of nuts which are embedded in the housing 1 during the moulding thereof.

The housing 1 is formed with a bore $1^2$ the longitudinal axis of which, when the housing 1 is mounted on the member T, is spaced from the longitudinal axis of the member T and extends substantially transversely thereto. At one end thereof the bore $1^2$ has a reduced diameter portion $1^4$ providing a shoulder $1^3$ within the bore $1^2$. The bore $1^2$ is arranged to receive a sleeve 4 which is inserted into the bore $1^2$ with one end thereof abutting the shoulder $1^3$. A reciprocating spindle 5 is axially slidable within the sleeve 4 and the stem of the spindle 5 projects through the reduced diameter portion $1^4$ outside the housing 1. The other end of the spindle 5 is formed with a head $5^1$ whose diameter is substantially the same as that of the sleeve 4 while the stem of the spindle 5 has a diameter which is substantially the same as the reduced diameter portion $1^4$.

A spring 9 is disposed around the spindle 5, one end of which spring bears against the head $5^1$ of the spindle 5 while the other end of the spring bears against the shoulder $1^3$, such spring tending to urge the stem of the spindle 5 into the bore $1^2$.

Slots $1^5$ are formed in the housing 1 and the sleeve 4, such slot $1^5$ connecting the bore $1^2$ with the external surface of the housing. An operating lever constituted by a bell crank lever 10 is pivotally mounted on the housing 1 by means of a pivot 11 supported in a lug formed on the housing 1. One arm of the bell crank lever projects through the slot $1^5$ formed in the housing 1 and sleeve 4, into the bore $1^2$ while the other arm is formed with a sleeve capable of retaining the flexible sheath G of a cable C. The cable C extends through a hole $1^6$ formed in the housing 1 and the sleeve 4 and extends transversely of the bore $1^2$ and through a further hole $1^7$ in the sleeve 4 and housing 1 and is clamped to the housing 1 by means of a nut and bolt 14.

The sleeve 4 is formed with a further slot which communicates with a groove $1^8$ formed in the bore $1^2$, such groove $1^8$ being located diametrically opposite to the slot $1^5$. The groove $1^8$ is connected to the external surface of the housing 1 by a screw-threaded bore adapted for receiving a set-screw 15 which projects into the slot $1^8$ and provides a stop for the arm $5^2$ of the bell crank lever. Around the set-screw 15 and between the head $15^1$ thereof and the surface of the housing 1 there is provided a spring 16 which tends to urge the set-screw 15 out of the screw-threaded bore.

The stem of the spindle 5 has attached thereto a chain guide member or fork for controlling the position of the chain of the vehicle. The guide member consists of a pair of spaced apart bearing plates 7 and 8 which are secured to the spindle by means of a set-screw 6.

The operation of the device is as follows:

If the effective length of the cable C is decreased, the cable C will be displaced within the sheath G causing the latter to move the bell-crank lever 10 angularly around the pivot 11 so that the arm $5^2$ of the bell-crank lever 10 will abut the head $5^1$ of the spindle 5 causing it to move, against the action of the spring 9, out of the bore. The guide member will thus be moved away from the tubular member T. If, on the other hand the effective length of the cable C is increased, then the bell-crank lever 10 will be moved in the opposite angular direction allowing the spindle 5, under the influence of the spring 9, to move inwardly into the bore $1^2$, thus moving the guide member towards the tubular member T. A cap 17 is provided at the end of the bore $1^2$ remote from the reduced diameter portion $1^4$ and such cap 17 retains the sleeve 4 within the bore $1^2$.

The amplitude of maximum angular movement of the bell-crank lever 10 may be limited by varying the amount by which the set-screw 15 projects into the slot $1^8$ in the housing 1.

According to the present invention the housing 1 and the bracket 2 together with the cap 17 are to be made entirely of a synthetic plastic material which may or may not be reinforced with metallic inserts.

With a device as hereinbefore described there is:

(1) A diminution in the risk of corrosion by the elimination of metal elements,
(2) A reduction in weight,
(3) Silent operation,
(4) A more gentle manipulation and less chance of wear.

The invention is in no way limited to the specific embodiment which has been disclosed but covers all variations and modifications within the skill of one knowledgeable in the art.

The synthetic plastic material to be employed in the above described device may be an acetal polymer such as for instance a homopolymer acetal resin.

What is claimed is:

1. A chain shift device for chain driven vehicles comprising a housing having a bore therein, chain guide means for displacement of a chain of the vehicle during a gear changing operation, a spring loaded spindle slidably supported in said bore and in turn supporting the chain guide means for displacement, means supported from said housing and in contact with the spindle for moving the same to effect desired displacement of the chain, said housing being constituted of synthetic plastic material and metal sleeve means in the bore of the housing isolating the spindle therefrom and providing a bearing surface for the spindle.

2. A chain shift device as claimed in claim 1 wherein said housing is provided with a groove which extends from the bore and opens externally of the housing, the device further comprising a member threadably engaged in the groove of the housing and having an end which is adjustable in said bore for constituting a stop for said spindle.

3. A chain shift device as claimed in claim 2 wherein said sleeve means is provided with a slot to permit passage of the member which is threadably engaged in the groove.

4. A chain shift device as claimed in claim 1 wherein said means for moving the spindle comprises a bell crank lever pivotally supported from the housing and including an arm in contact with the spindle, said sleeve means being provided with a slot to permit passage of the latter arm.

5. A device as claimed in claim 4, including an adjustable set screw threadably supported in said housing and extending in the path of angular movement of said arm of the bell crank lever for limiting the amplitude of angular movement of the latter.

6. A chain shift device as claimed in claim 1 wherein said spindle includes an enlarged head portion and a shank portion and said bore includes an enlarged diameter portion and a reduced diameter portion defining a shoulder within said bore, said sleeve means constituting a bearing surface for said enlarged head portion whereas said reduced diameter portion of said bore constitutes a bearing surface for said shank portion of said spindle.

7. A chain shift device as claimed in claim 6, including a compression spring encircling said spindle and having one end abutting said shoulder in said bore and an opposite end abutting the enlarged head portion of said spindle and a cap of synthetic plastic material for closing the end of said bore remote from said chain guide means and retaining said metal sleeve means within the bore.

8. A device as claimed in claim 7, said housing is provided with a concave recess formed therein for engagement around part of a frame member of said vehicle, screw-threaded metal nuts embedded in said housing on either side of said recess, a bracket of synthetic plastic material, threaded bolts carried by said bracket of synthetic plastic material and engaged in said nuts, whereby the housing and bracket can be securely clamped around said frame member.

9. A device as claimed in claim 8, including lugs moulded on said housing, pivot means carried by said lugs and pivotally mounting said bell crank lever.

10. A device as claimed in claim 9, including a nut embedded in said housing, during the moulding thereof, a bolt co-operating with said nut for clamping one end of a cable, a sheath surrounding said cable and connected to said second arm of the bell crank lever, whereby movement of said sheath relative to the cable causes said bell crank lever to be pivotally moved.

References Cited by the Examiner

UNITED STATES PATENTS

| | | |
|---|---|---|
| 1,963,940 | 6/34 | Duffy. |
| 2,741,516 | 4/56 | Deventer _____ 308—237 X |
| 2,760,378 | 8/56 | Deventer. |

FOREIGN PATENTS 836,862   6/60   Great Britain.

DON A. WAITE, *Primary Examiner.*